United States Patent [19]

Wen et al.

[11] Patent Number: 5,190,421
[45] Date of Patent: Mar. 2, 1993

[54] COOLANT SUPPLY SYSTEM FOR A MACHINE TOOL

[75] Inventors: Jiaxuan Wen, Horseheads; Jack F. Sheehan; Terrence M. Sheehan, both of Elmira, all of N.Y.; Gary L. Comstock, Gillett, Pa.

[73] Assignee: Hardinge Brothers, Inc., Elmira, N.Y.

[21] Appl. No.: 794,918

[22] Filed: Nov. 20, 1991

[51] Int. Cl.[5] .......................................... B23Q 11/10
[52] U.S. Cl. .................................... 408/56; 184/6.14; 407/11; 408/61
[58] Field of Search ......................... 408/56, 57, 59, 60, 408/61; 409/136; 407/11; 29/DIG. 50, DIG. 54, DIG. 63, DIG. 87, DIG. 93; 184/6.14

[56] References Cited

U.S. PATENT DOCUMENTS

| | | |
|---|---|---|
| 2,434,679 | 1/1948 | Wagner et al. . |
| 2,929,566 | 3/1960 | Paasche .................................. 407/11 |
| 3,375,742 | 4/1968 | Sturm ..................................... 408/56 |
| 3,726,363 | 4/1973 | Jusman .................................. 408/56 |
| 3,893,355 | 7/1975 | Maastricht . |
| 4,076,442 | 2/1978 | Cox, Jr. et al. . |
| 4,529,340 | 7/1985 | O'Dell .................................... 408/59 |
| 4,657,068 | 4/1987 | Peltz . |
| 4,778,315 | 10/1988 | Duffy et al. ........................... 408/61 |
| 4,830,553 | 5/1989 | Abeyta et al. . |

FOREIGN PATENT DOCUMENTS

| | | |
|---|---|---|
| 218045 | 9/1987 | Japan ................................... 409/136 |
| 1342602 | 10/1987 | U.S.S.R. .............................. 407/11 |
| 2010137A | 6/1979 | United Kingdom . |

Primary Examiner—Daniel W. Howell
Attorney, Agent, or Firm—Shlesinger, Arkwright & Garvey

[57] ABSTRACT

A coolant supply system for a machine tool comprises a coolant source; a nozzle for directing coolant to inside of a workpiece from the coolant source; another nozzle for directing coolant to outside of the workpiece from the coolant source; and a valve for automatically selectively directing coolant only to the inside of the workpiece, thereby increasing coolant flow to the inside of the workpiece when needed.

26 Claims, 6 Drawing Sheets

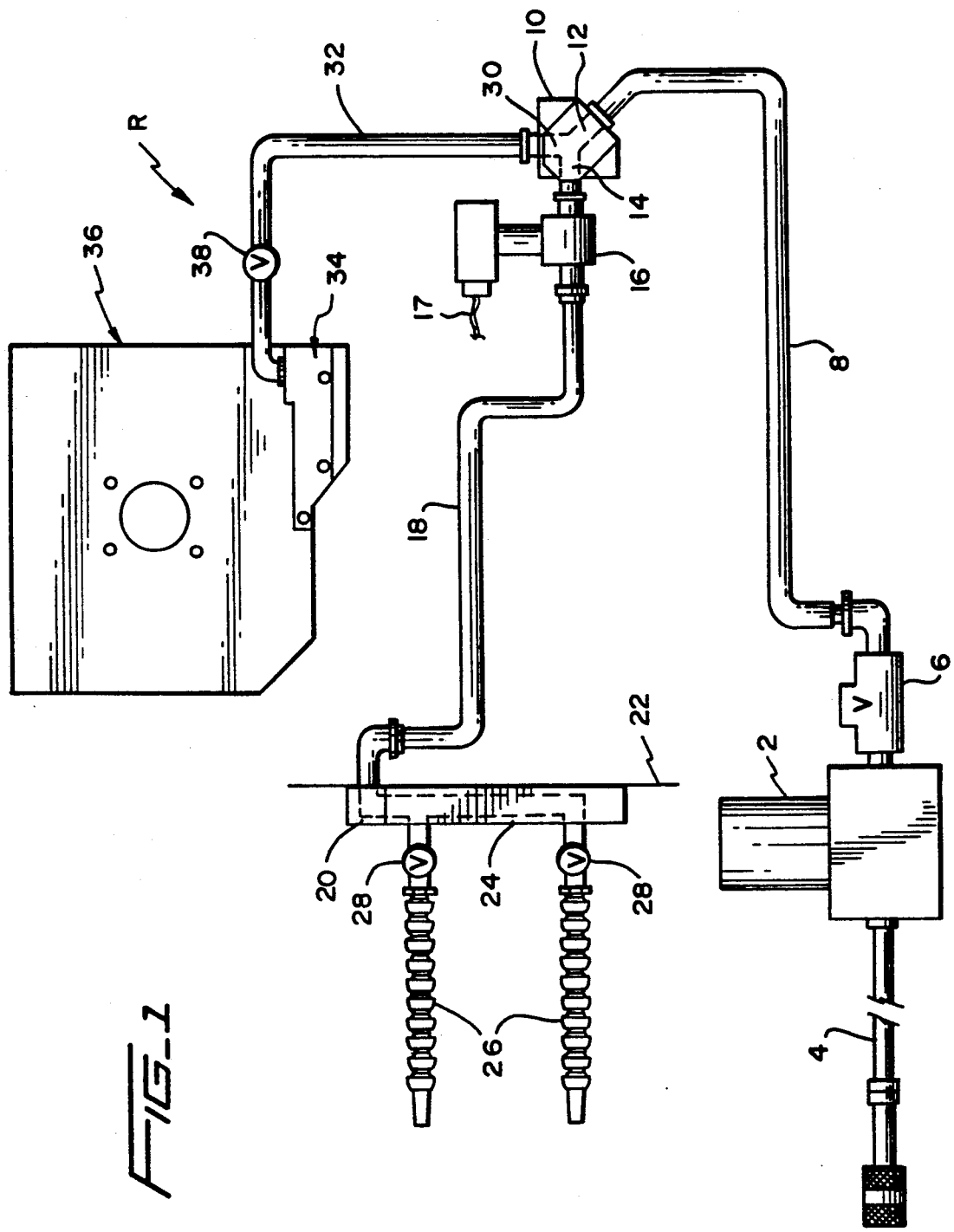
FIG_1

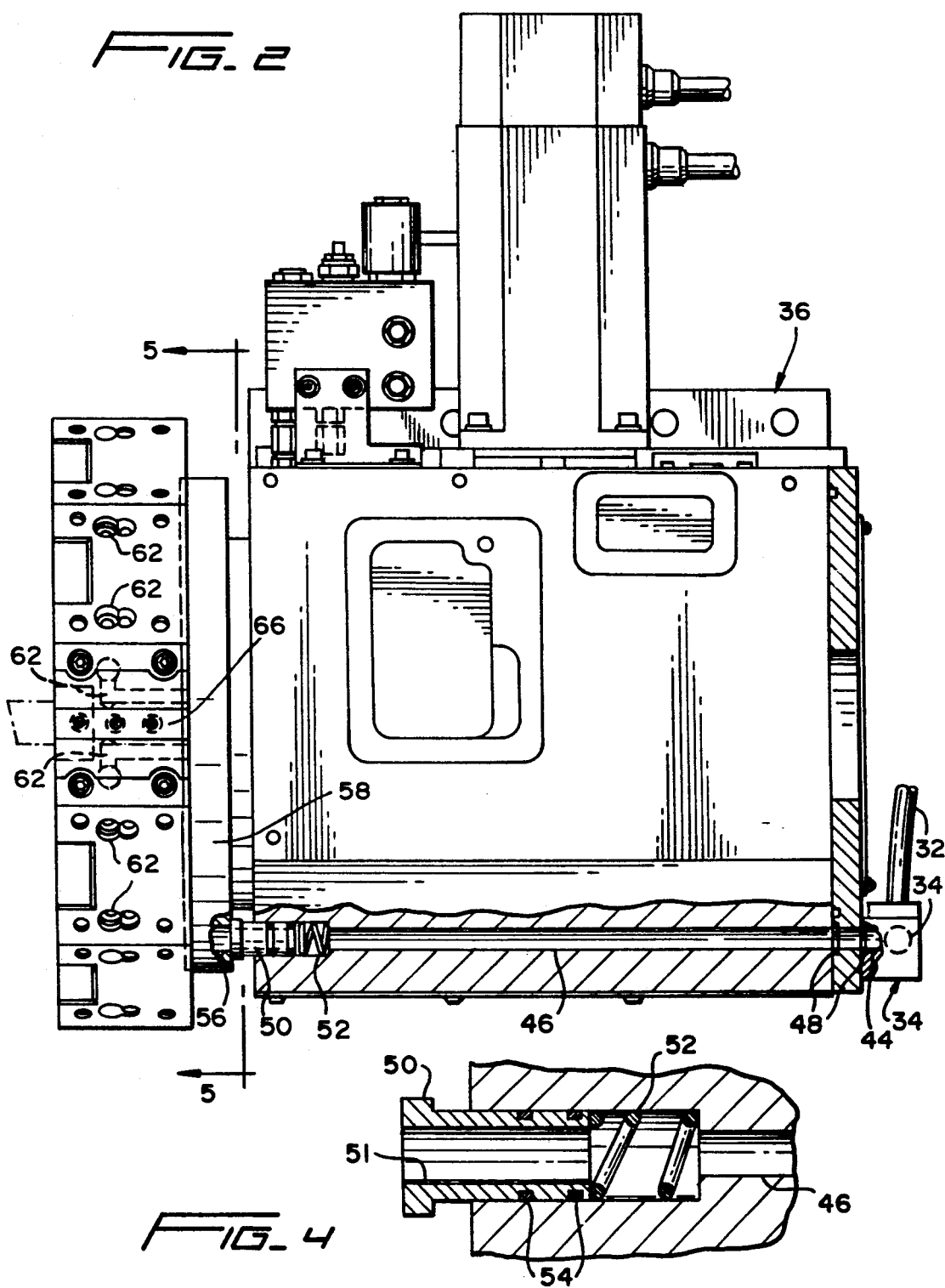

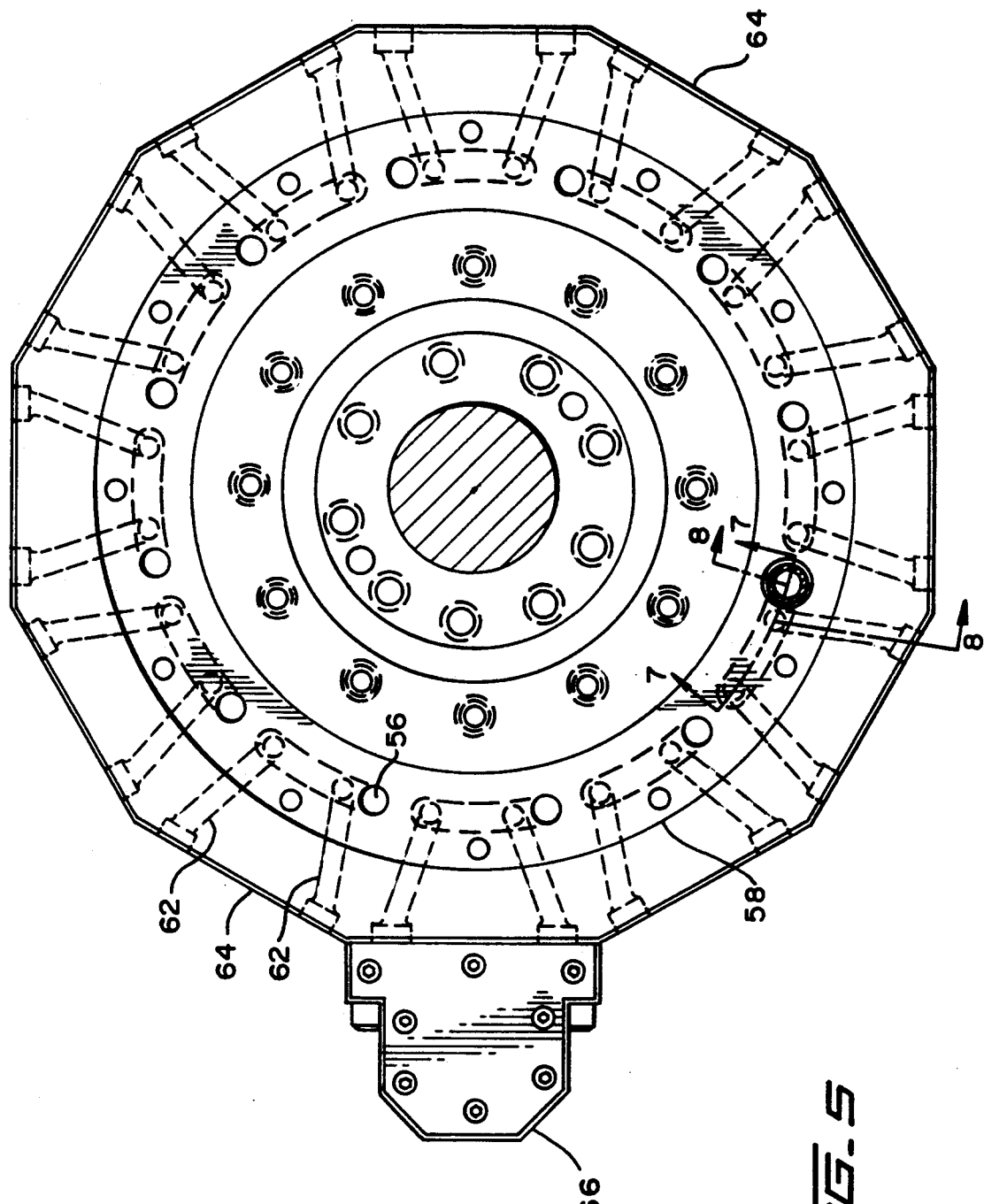

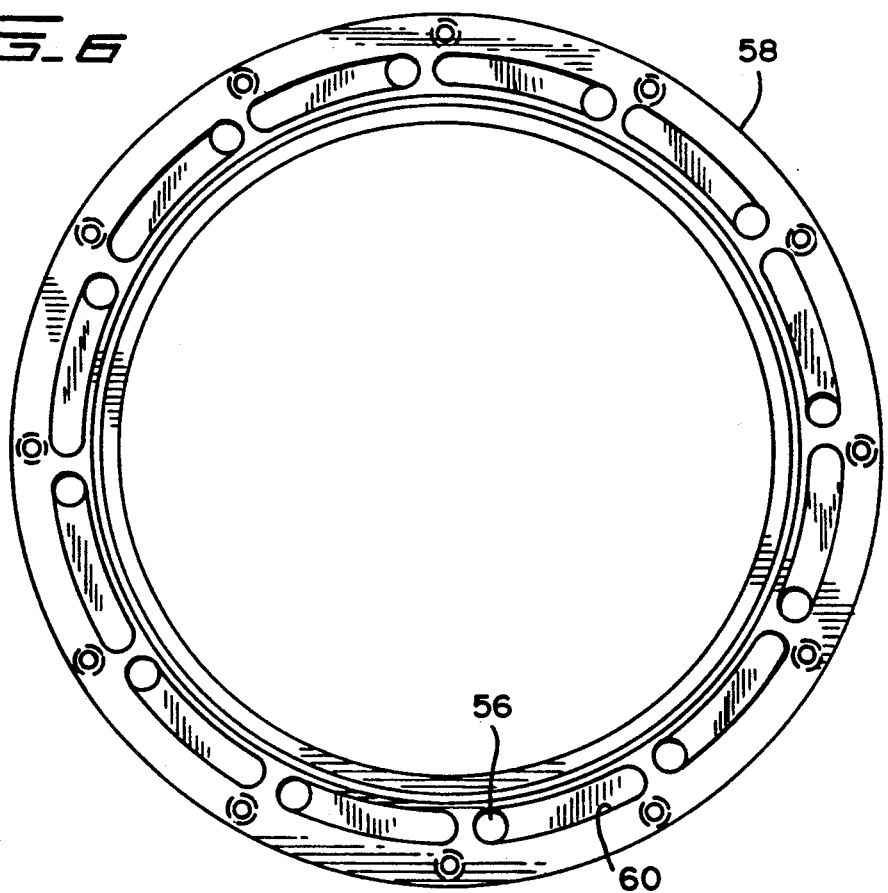
FIG_6
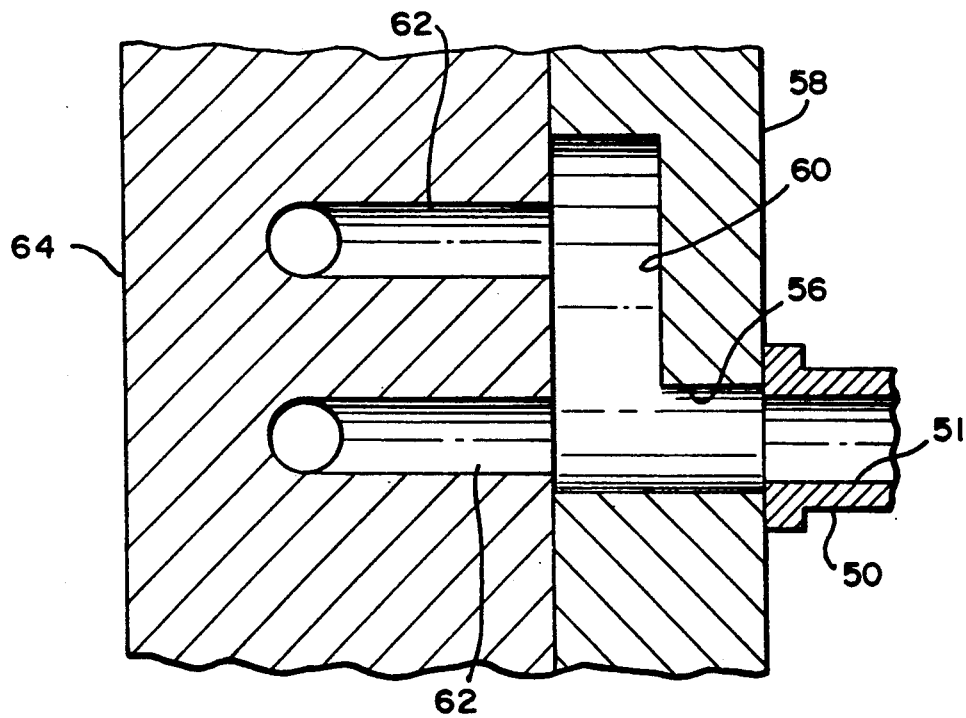
FIG_7

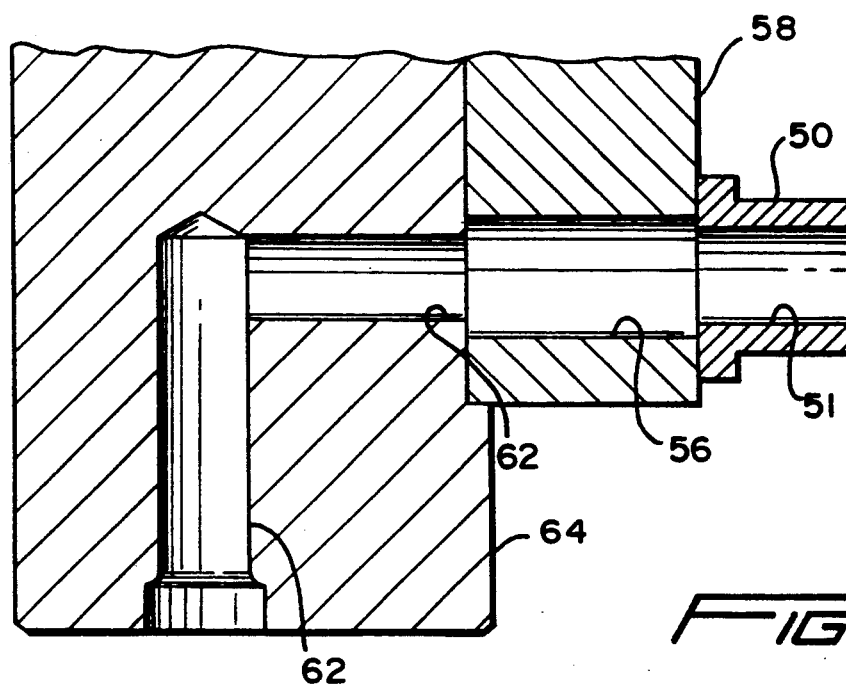
FIG_8
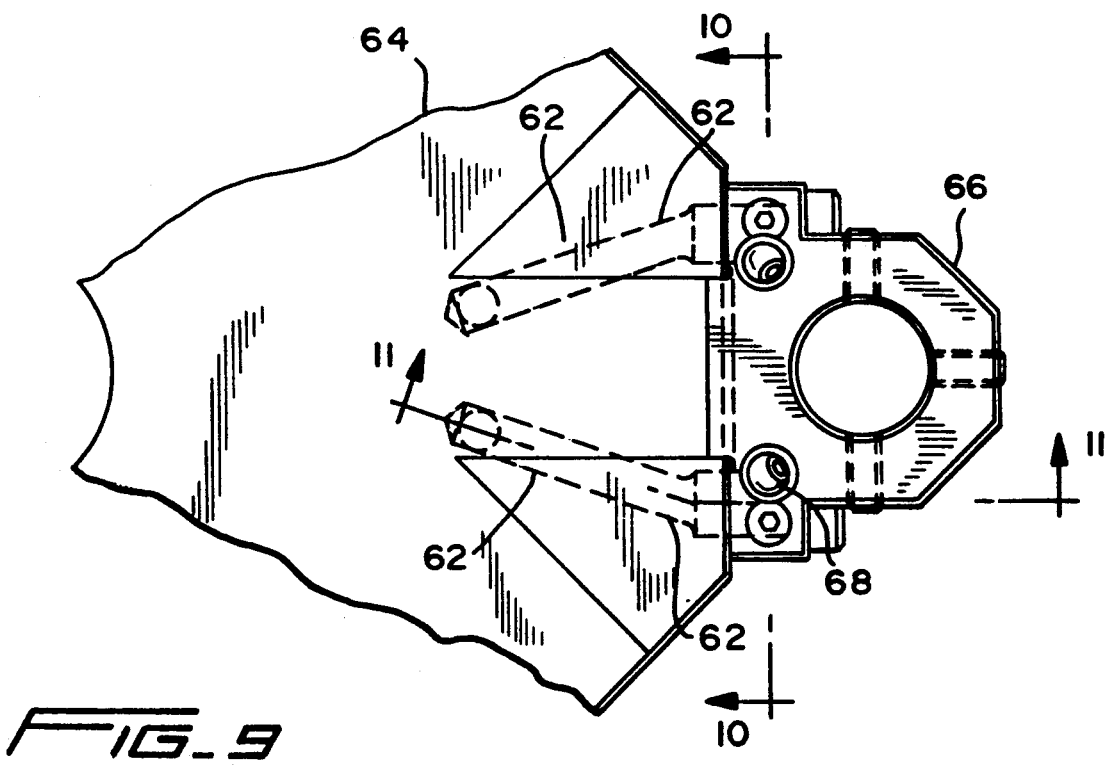
FIG_9

COOLANT SUPPLY SYSTEM FOR A MACHINE TOOL

FIELD OF THE INVENTION

The present invention relates generally to a coolant supply system for a machine tool, and particularly to a coolant supply system that can be automatically controlled at various areas of a machine tool as demanded by a particular machining operation.

BACKGROUND OF THE INVENTION

Normally, a coolant supply system for a machine tool provides coolant flow at the headwall and at the tool holder. Typically, these coolant flow outlets are either on or off at the same time, since there is only one coolant pump serving these outlets and the pump is either operated on or off. Also, the coolant outlets are provided with manually operable valves that can be selectively turned on or off manually. However, there is no provision for automatically turning off selected coolant outlets during a particular phase of a preprogrammed automatic machining operation to increase coolant flow at a particular location in the machine tool.

In a computerized numerically controlled machine tool, the various machining operations to produce a specific part are typically preprogrammed by an operator. Operations such as drilling, facing, cut-off, etc. are done by the machine automatically without intervention from the operator. During these operations, coolant flows are needed to prevent the part and the tools from overheating, to provide a means of lubrication for the cutting tools, to minimize thermal growth for the part being machined and the cutting tool that could otherwise cause errors in the parts being machined, etc. Coolant flow typically would be maintained at the headwall and the turret outlets. Therefore, during a drilling operation, the headwall outlet which would typically be directing coolant flow on the outside of a workpiece would be on, including a coolant flow outlet that directs coolant flow to the inside of the workpiece.

During a drilling operation, or any inside diameter machining operation, it is advantageous to increase the coolant flow directed to the inside of the workpiece, where most of the work and energy are being expended. This feature is not currently available in prior art coolant supply systems.

There is therefore a need for a coolant supply system for a machine tool wherein coolant flow directed to a particular portion of a workpiece can be selectively increased to meet the demand of the machining operation.

OBJECTS AND SUMMARY OF THE INVENTION

It is an object of the present invention to provide a coolant supply system for a machine tool that can direct the coolant flow to various areas of the machine on demand.

It is another object of the present invention to provide a coolant supply system that maximizes the coolant flow to any particular part of a machine tool on demand.

It is yet another object of the present invention to provide a coolant supply system that directs maximum coolant flow where it is needed during a particular machining operation.

It is another object of the present invention to provide a coolant supply system that can direct all the available coolant flow to the inside of a work piece as needed.

It is an object of the present invention to provide a coolant supply system whose output can be programmed with various machining operations of the machine tool in making a part.

These and other objects of the present invention will become apparent from the following detailed description.

BRIEF DESCRIPTIONS OF THE DRAWINGS

FIG. 1 is a pictorial diagram of a coolant supply system in accordance with the present invention.

FIG. 2 is an enlarged side elevational view, with portions shown in cross-section, showing the coolant flow passageway through a turret body and a turret top plate.

FIG. 4 is an enlarged, fragmentary, cross-sectional view, showing the connection between the turret body and the turret top plate in FIG. 2 for the coolant passageway.

FIG. 5 is an enlarged rear plan view taken along line 5—5 in FIG. 2 of a coolant ring and the turret top.

FIG. 6 is a front plan view of the coolant ring disposed between the top plate and the turret body shown in FIGS. 2 and 5.

FIG. 7 is an enlarged, cross-sectional view taken along lines 7—7 in FIG. 5.

FIG. 8 is an enlarged, cross-sectional view taken along line 8—8 in FIG. 5.

FIG. 9 is an enlarged fragmentary front view of the turret top plate and the tool holder in FIG. 5.

DETAILED DESCRIPTION OF THE INVENTION

Figure 10:
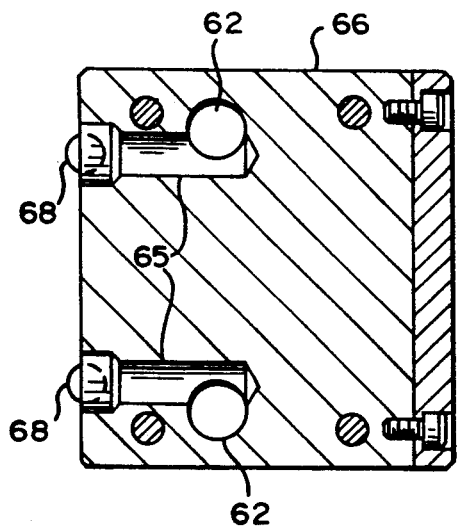
FIG. 10 is an enlarged cross-sectional view taken along line 10—10 in FIG. 9.

A coolant supply system R for use in a machine tool (not shown) is disclosed in FIG. 1. A pump 2 is operably associated with a coolant reservoir (not shown) by means of a hose 4 connected to its inlet side. A check valve 6 is operably connected to the outlet side of the pump 2. A hose 8 connects the check valve 6 to an inlet manifold 10, which has a substantially "Y"-shaped passageway 12 for dividing the coolant flow from the hose 8 into two flows. One branch 14 of the passageway 12 connects to a normally open solenoid valve 16. Electrical connection means 17 ties to a computer (not shown) for receiving signals therefrom when to close. A hose 18 connects the solenoid valve 16 to headwall manifold 20 secured to a head wall 22 within an enclosure (not shown) of the machine tool (not shown). The head wall 22 is typically disposed behind the face of the machine spindle (not shown) and generally disposed transversely to the axis of rotation of the spindle.

The manifold 20 has an internal passageway 24 that is operably connected to the hose 18 and to a number of flexible nozzles 26, as best shown in FIG. 1. Each of the nozzles 26 is equipped with a manually operable valve 28 to permit the operator to selectively control the coolant flow from each of the nozzles 26.

The other branch 30 of the passageway 12 in the inlet manifold 10 connects to a hose 32, which in turn connects to a coolant block 34, which operably connects to a turret body 36, as best shown in FIGS. 1 and 2. A manually operable valve 38 is disposed in the hose 32 for operator control of the coolant flow.

Figure 3:
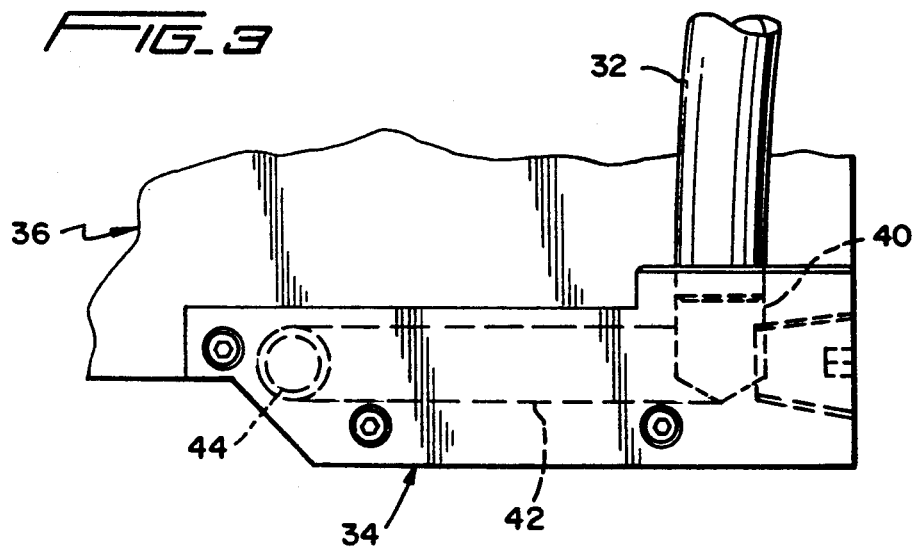
FIG. 3 is an enlarged, fragmentary view of a coolant block for connecting the coolant supply to the turret body shown in FIGS. 1 and 2.

The coolant block 34 has a passageway 40 operably associated with the hose 32, a passageway 42 transversely disposed to and communicating with the passageway 40, and a passageway 44 disposed transversely to and communicating with the passageway 42, as best shown in FIG. 3.

The coolant block 34 is operably secured to the turret body 36 such that the passageway 44 communicates with a passageway 46 disposed through the turret body 36, as best shown in FIG. 2. Seals 48 provide for liquid tight connection. A sleeve 50 is disposed at the other end of the passageway 46 and is biased outwardly by a spring 52. Seals 54 provide for liquid tight connection between the sleeve 50 and turret body 36. The sleeve 50 cooperates with a respective hole 56 disposed in a turret coolant ring 58, as best shown in FIGS. 5 and 7. The sleeve 50 has a central opening 51 that communicates with the passageway 46, as best shown in FIG. 4.

Figure 11:
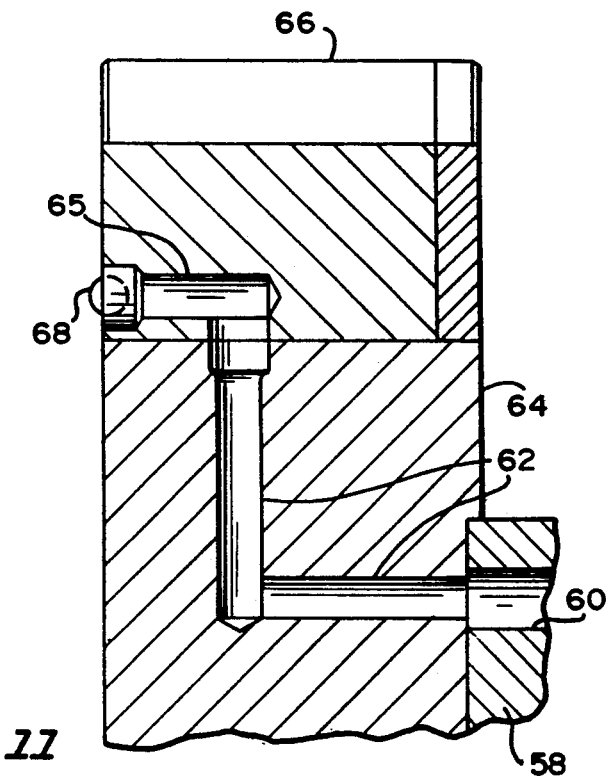
FIG. 11 is an enlarged cross-sectional view taken along line 11—11 in FIG. 9.

The coolant ring 58 has a plurality of slots 60 associated with each respective hole 56, as best shown in FIGS. 5 and 6. A plurality of pairs of passageways 62 are disposed in a turret top plate 64 and communicates with respective slots 60, as best shown in FIGS. 5 and 7. Each pair of passageways 62 communicate with respective passageways 65 in a tool holder 66, as best shown in FIGS. 9, 10 and 11. The passageways 65 within the tool holder 66 terminate in respective nozzle balls 68, as best shown in FIG. 9. The nozzle balls 68 are adjustable such that the coolant flow can be directed in any direction, including into the inside of a workpiece during boring, drilling operations, inside diameter work, etc.

The turret top plate 64 is disclosed as having 12 stations for accommodating 12 tool holders. One tool holder might be for a tool for facing, another tool holder might be for a tool for cut-off, yet still another tool holder might be for a drill, etc. The turret body 36 indexes and secures in place the appropriate tool for a particular machining operation. Although the turret top plate 64 can have a number of tool holders 66, a person of ordinary skill in the art will understand from the above description that coolant flow is provided to only one tool holder that is presently indexed to work on the workpiece.

Although the coolant supply system R is disclosed for a turret-type machine tool, a person of ordinary skill in the art will understand that the invention is also applicable to a gang-tool machine. In a gang-tool machine, multiple tool holders are disposed along a top plate and each has a coolant nozzle, which typically is on or off at the same time. In accordance with the present invention, each nozzle can be equipped with a solenoid valve. After each tool is used, the nozzle associated with that tool can then be turned off by the associated solenoid valve, thereby increasing the coolant flow in the nozzle associated with the tool that will be used next.

OPERATION

The operator would program the solenoid valve 16 to close during specific stages of a machining operation. Typically, the operator would program the machine tool such that the valve 16 would close during boring, drilling operations, inside diameter work, etc. such that all the coolant flow generated by the pump 2 is directed through the turret body 36 and out through the coolant balls 68 in the tool holder 66, thereby providing maximum coolant flow to the inside of a workpiece, where it is most needed. The coolant flow out of the nozzle 26 would therefore be cut off by the valve 16. During normal operation, such as facing or cut-off, the valve 16 would be normally open, thereby permitting coolant flow through the nozzles 26 and the coolant balls 68.

A person of ordinary skill in the art will understand that closing the solenoid valve 16 would increase the coolant flow available at the tool holder 66. The coolant supply system R comprises a coolant circuit with one coolant path going to the headwall 22 and another parallel coolant path going to the turret body 36. Thus, the coolant flow through the hose 8 is divided into the two paths. Consequently, shutting off one path will increase the coolant flow in the other remaining path, with the pump output remaining constant.

Other means for effecting increased coolant flow at the tool holder 66 can be used. For example, a separate coolant circuit to the tool holder 66 can be provided, along with a separate pump with variable speed control wherein the output of the pump can be varied by varying the pump speed.

A computerized numerically controlled machine tool is well known in the art. The machine tool typical has a programmable computer that directs the various operations that the machine has to go through to make a specific part. Thus, after programming, the machine tool would go through its paces without operator intervention, and would machine a number of identical parts repeatedly. Since the solenoid valve 16 is electrically operated, it will be understood by a person of ordinary skill in the art that it can be programmed into the computer such that at certain stages of the machining operation, the computer would send a signal to close the valve 16 automatically, without operator intervention.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A coolant supply system for a machine tool, comprising:
   a) a coolant source;
   b) first means for directing coolant to the inside of a workpiece from said coolant source;
   c) second means for directing coolant to outside of the workpiece from said coolant source; and
   d) an electrically actuated valve for automatically selectively directing coolant only to the inside of the workpiece, thereby increasing coolant flow to the inside of the workpiece when needed.

2. A coolant supply system as in claim 1, wherein:
   a) said first means is operably associated with a tool holder.

3. A coolant supply system as in claim 2, wherein:
   a) said first means includes a passageway disposed in the tool holder.

4. A coolant supply system as in claim 3, wherein:
   a) said tool holder is a turret assembly; and b) said turret assembly includes means for directing coolant flow only with the tool holder being used.

5. A coolant supply system as in claim 1, wherein:
a) said second means is operably associated with a headwall of the machine tool.

6. A coolant supply system as in claim 1, wherein:
a) said second means includes at least a flexible nozzle disposed on a headwall of the machine tool.

7. A coolant supply system as in claim 6, wherein:
a) said second means includes a manifold for supplying coolant to said at least a flexible nozzle.

8. A coolant supply system as in claim 1, wherein:
a) said first means is operably associated with a tool holder;
b) said second means is operably associated with a headwall of the machine tool; and
c) a manifold means for diverting said coolant source to the headwall and to said tool holder.

9. A coolant supply system as in claim 8, wherein:
a) said manifold has a substantially "Y"-shaped passageway.

10. A coolant supply system as in claim 1, wherein:
a) said first means is operably associated with a tool holder;
b) said second means is operably associated with a headwall of the machine tool;
c) a manifold means for diverting said coolant source to the headwall and to said tool holder; and
d) said electrically actuated valve is disposed downstream of said manifold between the headwall and said manifold.

11. A coolant supply system as in claim 1, wherein:
a) said electrically actuated valve is a solenoid valve.

12. A coolant supply system for a machine tool comprising:
a) first means for directing coolant to one location in a machine tool;
b) means for increasing coolant flow to said one location during one type of machining operation requiring increased coolant flow;
c) second means for directing coolant to another location in a machine tool;
d) said first and second means comprising a coolant supply circuit;
e) said increasing means including means for automatically shutting off coolant flow in said second means during the one type of machining operation thereby diverting all coolant flow to said one location only;
f) said coolant supply circuit includes a first coolant path associated with said one location and a second parallel coolant path associated with said another location; and
g) electrically actuated valve disposed in said second coolant path for shutting off the coolant flow in said second coolant path during one type of machining operation.

13. A coolant supply system as in claim 12, wherein:
a) said electrically actuated valve means is a solenoid valve.

14. A coolant supply system as in claim 12, wherein:
a) said first means is operably associated with a tool holder.

15. A coolant supply system as in claim 12, wherein:
a) said first means is operably associated with a tool holder; and
b) said first means includes a passageway disposed in said tool holder.

16. A coolant supply system as in claim 15, wherein:
a) said tool holder is a turret assembly.

17. A coolant supply system as in claim 12, and further comprising:
a) a manifold means for diverting coolant to said first and second coolant paths from a coolant source.

18. A coolant supply system as in claim 12, and further comprising:
a) a manifold means for diverting coolant to said first and second coolant paths from a coolant source; and
b) said electrically actuated valve is disposed downstream of said manifold means.

19. A coolant supply system as in claim 18, wherein:
a) said manifold means has a substantially "Y"-shaped passageway.

20. A coolant system for a machine tool comprising:
a) a coolant source;
b) first means for directing coolant to the inside of a workpiece from said coolant source;
c) second means for directing a coolant to the outside of a workpiece from said coolant source;
d) third means for simultaneously conveying coolant from said coolant source to said first means and second means; and,
e) an electrically actuated valve for automatically and selectively directing coolant only to the inside of the workpiece while continuously conveying said coolant from said coolant source.

21. A cooling system for a machine tool as recited in claim 20 and wherein:
a) said first means for directing coolant to the inside of a workpiece is operably associated with a tool holder.

22. A coolant supply system as recited in claim 21 and wherein:
a) said first means includes a passageway disposed in the tool holder.

23. A coolant supply system as recited in claim 22 and wherein:
a) said tool holder is a turret assembly; and
b) said turret assembly includes means for directing coolant flow only within the tool holder being used.

24. A coolant supply system as recited in claim 20 and wherein:
a) said second means is operably associated with a headwall of a machine tool.

25. A coolant supply system as recited in claim 20 and wherein:
a) said second means includes at least one flexible nozzle disposed on a headwall of a machine tool.

26. A coolant supply system as recited in claim 25 and wherein:
a) said system means includes a manifold for supplying coolant to said at least one flexible nozzle.

* * * * *